UNITED STATES PATENT OFFICE.

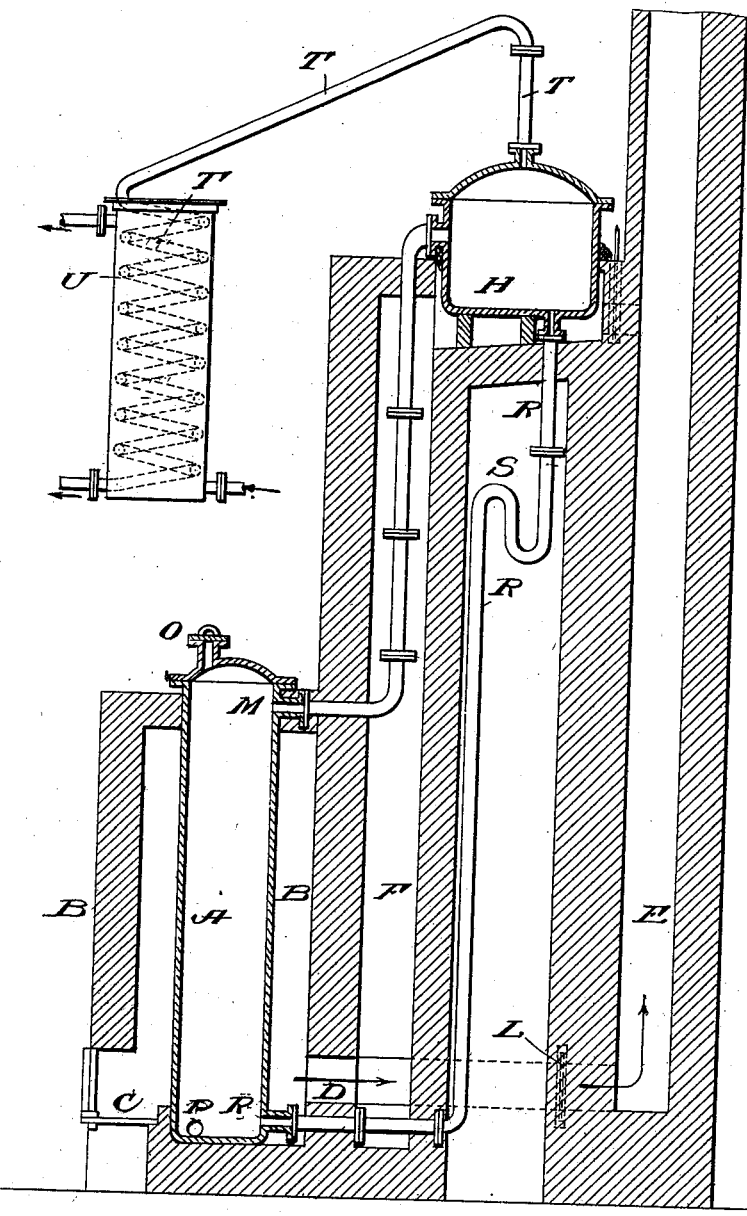

CHARLES COMBES, OF PARIS, FRANCE.

PROCESS OF MAKING CARBON TETRACHLORID.

SPECIFICATION forming part of Letters Patent No. 735,948, dated August 11, 1903.

Application filed January 20, 1902. Serial No. 90,554. (No specimens.)

*To all whom it may concern:*

Be it known that I, CHARLES COMBES, mining engineer, a citizen of the Republic of France, residing at Paris, France, have invented Improvements in the Manufacture of Carbon Tetrachlorid, of which the following is a specification.

My process is based on the following observations:

First. I have found that by passing sulfur chlorid ($S_2Cl_2$) over carbon heated to a suitable temperature—for example, a red heat—there occurs a reaction producing a mixture of carbon bisulfid and carbon tetrachlorid. Among possible explanations of this fact I may mention this: The sulfur chlorid is dissociated by the heat into sulfur and chlorin, carbon bisulfid is formed by action of the liberated sulfur on the carbon, and this carbon bisulfid is partly converted into carbon tetrachlorid and sulfur chlorid by the chlorin. These changes may be illustrated by the following equations:

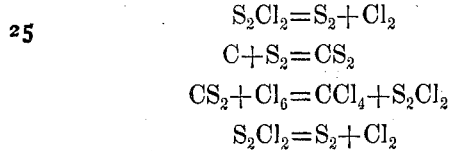

$$S_2Cl_2 = S_2 + Cl_2$$
$$C + S_2 = CS_2$$
$$CS_2 + Cl_6 = CCl_4 + S_2Cl_2$$
$$S_2Cl_2 = S_2 + Cl_2$$

and so on.

Second. I have found also that if a current of chlorin is introduced at the same time into the apparatus the carbon bisulfid formed according to the foregoing reactions is largely converted into carbon tetrachlorid and sulfur chlorid, the latter of which reacts anew in the manner indicated, so that for a given quantity of sulfur chlorid used a much larger proportion of carbon tetrachlorid is obtained than that corresponding with the sulfur chlorid.

Third. I have found, finally, that for the sulfur chlorid ($S_2Cl_2$) may be substituted other sulfur chlorids richer in chlorin or even a mixture of sulfur and chlorin.

My invention relates to a process for the manufacture of carbon tetrachlorid based on the foregoing principles.

The following examples illustrate two modes of carrying out the manufacture:

Example 1: Into a vertical retort of refractory material not attacked by chlorin, like those used for the manufacture of carbon bisulfid or for distilling sulfur, and heated externally is first introduced a charge of carbon, such as breeze, wood-charcoal, or coke. There is next introduced into the lower part by some suitable means one of the chlorids of sulfur. The products are liquefied in a condenser and consist of carbon tetrachlorid and carbon bisulfid with some sulfur chlorid, which has probably been carried over mechanically. By distillation these three products are separated. The carbon bisulfid may then be transformed by an ordinary process into carbon tetrachlorid and sulfur chlorid, and the latter, added to the sulfur chlorid already recovered, may be returned to the process.

Example 2: In order to avoid starting with carbon bisulfid and to convert directly into the tetrachlorid all the carbon combined with the sulfur of the carbon bisulfid, chlorin may be admitted into the lower part of the apparatus already described. By suitably regulating this admission of chlorin the liquid condensed at the exit of the retort is richer in carbon tetrachlorid than in the previous case. Finally by arranging at the exit of the retort a dephlegmator whose temperature is suitably regulated nearly the whole of the sulfur chlorid carried over condenses in the dephlegmator and may be returned by a siphon to the lower part of the retort, while the carbon-tetrachlorid vapor is liquefied in a condenser, as aforesaid. The condensed liquid now contains a very small proportion of carbon bisulfid. Under these conditions may be realized the manufacture of carbon tetrachlorid without by-products by merely introducing after the beginning carbon and chlorin, the sulfur chlorid serving only as a carrying agent and remaining constantly in the apparatus or its adjuncts, the dephlegmator, siphon, and the like. It will be understood that instead of a current of gaseous chlorin there may be introduced into the retort a sulfur chlorid richer in chlorin than $S_2Cl_2$ and that the small quantity of sulfur chlorid necessary to start the reaction may be formed once for all by introducing into the apparatus at the start a certain amount of sulfur.

The accompanying drawing is a vertical section through an apparatus suitable for this process.

A is a vertical retort for the reaction, set in a flue of refractory brick and heated by the fire-grate C. The flue-gases escape by flue D to the chimney E, either directly or by way of the flue F, in which is situated the dephlegmator H. The dampers K and L determine the direction to be taken and facilitate regulation of the temperature of the dephlegmator by adjusting the proportion of the flue-gas having access thereto. The retort A has a side tube M, leading to a pipe which carries the products to the dephlegmator H and passes through the flue F, so that it may be hot enough to prevent condensation of the products. The upper part of the retort has an opening O with suitable closure, through which the carbon is introduced. Chlorin is admitted through the pipe P, which opens into the lower part of the retort. The products condensed in the dephlegmator collect in the bottom thereof and return through the pipe R, provided with siphon-trap S, into the lower part of the retort A. The carbon tetrachlorid produced having traversed the dephlegmator passes through pipe T to the condenser U.

Thanks to the foregoing arrangement the interior of the retort A is virtually divided into a series of horizontal zones, the temperature of which decreases from below upward. Any other arrangement procuring the same conditions, such as an inclined retort, will suit equally well, provided the chlorin gas and the sulfur chlorid or the sulfur are introduced into the apparatus at the place where the temperature is highest. This place in the foregoing arrangement is the bottom of the retort, so that the chlorin or sulfur chlorid traverses the zones of successively lower temperature and the series of reactions aforesaid can be realized. For the same reason the carbon is introduced into the top of the retort, which is the coolest part.

Having thus described the nature of this invention and the best means I know of carrying the same into practical effect, I claim—

1. A process for the manufacture of carbon tetrachlorid consisting in bringing sulfur chlorid into contact with heated carbon in a suitable chamber.

2. A process for the manufacture of carbon tetrachlorid by heating carbon with sulfur chlorid in an atmosphere of chlorin, and condensing and separating the products in such a manner that sulfur chlorid is continuously returned to the system, substantially as described.

In witness whereof I have hereunto signed my name, this 6th day of January, 1902, in the presence of two subscribing witnesses.

CHARLES COMBES.

Witnesses:
MARCEL ARMENGAUD, Jeune,
EDWARD P. MACLEAN.